(12) United States Patent
Perez et al.

(10) Patent No.: US 8,535,043 B2
(45) Date of Patent: Sep. 17, 2013

(54) MOLDS FOR USE IN CONTACT LENS PRODUCTION

(75) Inventors: Jose L. Perez, Jacksonville, FL (US); David A. Katterhenry, Jacksonville, FL (US); Matias D. Heinrich, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 881 days.

(21) Appl. No.: 11/554,130

(22) Filed: Oct. 30, 2006

(65) Prior Publication Data
US 2008/0102151 A1 May 1, 2008

(51) Int. Cl.
*B29D 11/00* (2006.01)

(52) U.S. Cl.
USPC ........... 425/408; 425/410; 425/412; 425/808; 264/1.32; 249/160

(58) Field of Classification Search
USPC ......... 425/215, 808, 408, 410, 412; 249/134, 249/160, 117; 264/1.1, 1.36, 1.38, 2.5, 1.32
See application file for complete search history.

(56) References Cited

U.S. PATENT DOCUMENTS

| | | | |
|---|---|---|---|
| 4,284,399 A * | 8/1981 | Newcomb et al. | 425/410 |
| 4,640,489 A * | 2/1987 | Larsen | 249/122 |
| 4,761,069 A * | 8/1988 | Truong et al. | 351/160 H |
| 4,865,779 A | 9/1989 | Ihn et al. | |
| 5,252,056 A * | 10/1993 | Horner et al. | 425/555 |
| 5,254,000 A | 10/1993 | Friske et al. | |
| 5,271,875 A | 12/1993 | Appleton et al. | |
| 5,326,505 A * | 7/1994 | Adams et al. | 264/1.36 |
| 5,378,412 A * | 1/1995 | Smith et al. | 264/2.1 |
| 5,466,147 A * | 11/1995 | Appleton et al. | 425/412 |
| 5,540,410 A * | 7/1996 | Lust et al. | 249/134 |
| 5,620,720 A | 4/1997 | Glick et al. | |
| 5,861,114 A * | 1/1999 | Roffman et al. | 264/2.5 |
| 6,368,522 B1 * | 4/2002 | Ansell et al. | 264/1.1 |
| 6,444,145 B1 | 9/2002 | Clutterbuck | |
| 6,454,409 B1 * | 9/2002 | Lorenz et al. | 351/160 H |
| 6,869,549 B2 * | 3/2005 | Ansell et al. | 264/2.3 |
| 6,997,428 B1 * | 2/2006 | Andino et al. | 249/134 |
| 7,156,641 B2 * | 1/2007 | Ansell et al. | 425/215 |
| 7,320,587 B2 * | 1/2008 | Goodenough et al. | 425/542 |
| 2002/0196441 A1 | 12/2002 | Hall et al. | |
| 2006/0006558 A1 | 1/2006 | Yamada | |
| 2006/0240138 A1 | 10/2006 | Broad et al. | |
| 2007/0132124 A1 * | 6/2007 | Dubey et al. | 264/1.32 |

FOREIGN PATENT DOCUMENTS

JP  09011254 A  *  1/1997
TW  200530009 A  5/2003

OTHER PUBLICATIONS

Search Report for corresponding Taiwan Patent Application No. 096140495, Jan. 4, 2013.
Singapore Office Action for corresponding Application No. 201107970-4 completed Apr. 23, 2013.

* cited by examiner

Primary Examiner — Dimple Bodawala

(57) ABSTRACT

The present invention provides molds useful in contact lens production, which molds incorporate a centering and spacing feature in the form of tabs on one of the mold halves. The spacing feature both centers the mold halves in relationship to each other and permits free flow of excess monomer from the mold. Additionally, the spacing feature aids in height control of the one mold half in relation to the other mold half.

2 Claims, 4 Drawing Sheets

MOLDS FOR USE IN CONTACT LENS PRODUCTION

FIELD OF THE INVENTION

The invention relates to molds useful in the manufacture of contact lenses. In particular, the molds of the invention provide for the production of lenses with rounded edges.

BACKGROUND OF THE INVENTION

Methods and molds useful in the manufacture of contact lenses are well known. For example, in U.S. Pat. No. 5,540,410, incorporated herein in its entirety by reference, are disclosed molds and their use in contact lens manufacture. Lens molds are known for production of lenses having edges that are rounded. Such rounded edges are desirable because they avoid impingement of the lens edge into the lens' wearer's conjunctival membrane. However, the known lens molds are disadvantageous in that it is difficult to control the edge height adequately Additionally, production of lenses with rounded edges in the known molds results in the interruption of the flow of excess monomer from the mold. This produces not only monomer surrounding the lens formed in the mold, but monomer that, post-curing, is in more than one parts and is difficult to remove.

DETAILED DESCRIPTION OF THE INVENTION AND PREFERRED EMBODIMENTS

The present invention provided molds useful in contact lens production, methods for making the molds, and lenses resulting from use of the molds which lenses have rounded edges. The molds of the invention incorporate a centering and spacing feature in the form of tabs on one of the mold halves, which feature both centers the mold halves in relationship to each other and permits free flow of excess monomer from the mold. Additionally, the spacing feature aids in height control of the one mold half in relation to the other mold half.

In one embodiment, the invention provides a mold for the production of a contact lens comprising, consisting essentially of, and consisting of a front mold half and a back mold half wherein: the front mold half comprises, consists essentially of, and consists of a first article having a central curved section with a concave surface, a convex surface and a first circular circumferential edge about the concave surface of the central curved section, the central section of the concave surface suitable for imparting a curvature to the front curve of a contact lens; the first article also having an axis of symmetry about the concave surface and an inner surface continuous with and extending downwardly from the circular edge in a plane about 5 to about 15 degrees below the concave surface axis, an outwardly tapering wall extending upwardly from the inner surface, and an annular flange integral with and surrounding the outwardly tapering wall and extending radially outwardly from the concave and convex surfaces in a plane normal to the concave surface axis; the back mold half comprises, consists essentially of, and consists of a second article having a central curved section with a concave surface, a convex surface and a second circular circumferential edge about the convex surface of the central curved section, the central section of the convex surface suitable for imparting a curvature to the back curve of a contact lens; and the second article also having an axis of symmetry about the convex surface, a plurality of spaced apart tabs on the convex surface, each of the tabs comprising a wall extending outwardly from the circumferential edge of the convex surface, and an upwardly extending wall continuous with and extending upwardly from the outwardly extending wall at its inferior-most portion and continuous with the convex surface at its superior-most portion, and an annular flange integral with and surrounding and extending radially outwardly from the concave and convex surfaces in a plane normal to the convex surface axis.

Figure 1:
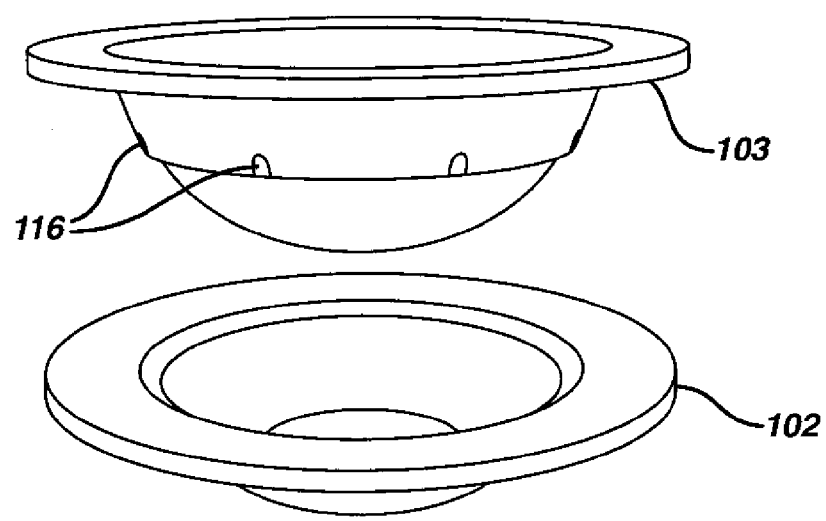
FIG. 1 is an exploded side elevation view of a mold of the invention.
Figure 2:
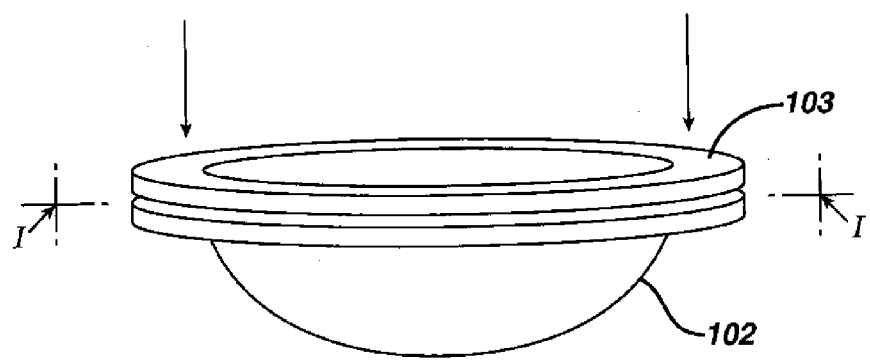
FIG. 2 is an elevated side view of an assembled mold of the invention.

Referring to the drawings, in FIGS. 1 and 2, there is illustrated an exploded side elevation view and a side view, respectively, of a mold of the invention. The mold is composed of two, complementary mold halves: a front mold half 102 and a back mold half 103. At spaced apart locations on the convex surface of mold half 103 are tabs 116 as seen in FIG. 1. A sufficient number of tabs must be provided to accomplish the desired centration and height control of the mold halves. Preferably, at least three tabs are provided on the back mold half 103. However, up to about thirty-six tabs may be provided. The molds of the invention are useful in producing contact lenses by polymerization of a polymerizable composition. The contact lenses produced using the mold of the invention are unhydrated lenses that may be made ready to wear by hydrating, or swelling, the lenses by any method known in the art.

Front mold half 102 and back mold half 103 may be formed of any suitable thermoplastic polymer, preferably one that is sufficiently transparent to ultra-violet light to allow irradiation therethrough to promote polymerization of a contact lens material, preferably a soft contact lens material. Additionally, it is desirable that the material used is moldable to surfaces of optical quality at relatively low temperatures, exhibits excellent flow characteristics, and remains amorphous during molding. Preferred materials for forming the mold halves of the invention are polyolefins including, without limitation, polystyrene, polypropylene, and combinations thereof. Each mold half may be formed from the same or a different material than the other mold half. Production of the mold halves may be accomplished by any convenient method, but preferably as set forth in U.S. Pat. No. 5,540,410. In the mold of the invention, more preferably the material used for formation of the back mold half 103 is harder, or less compressible, than that of front mold half 102.

Figure 3:
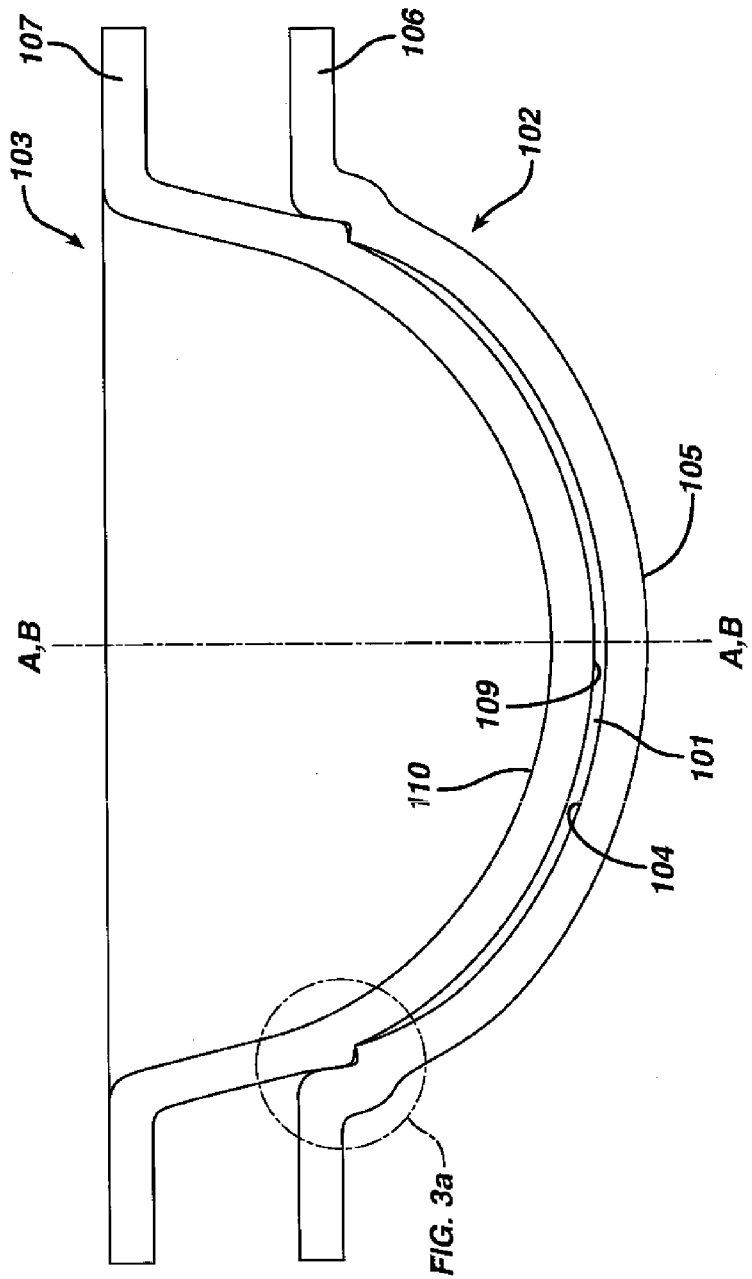
FIG. 3 is a cross-sectional view of the mold of FIG. 2.
Figure 3A:
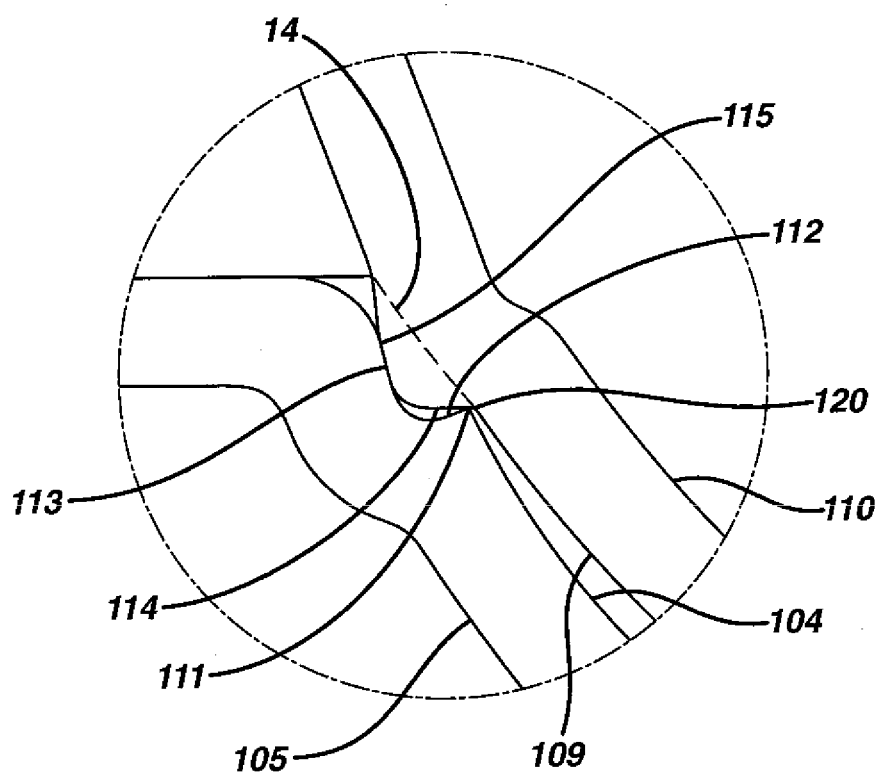
FIG. 3a is a magnified, cross-sectional side view of an area of the mold of FIG. 3.

FIG. 3 shows a cross-sectional side view of the mold of FIG. 2 along I-I, which cross-section is through one of the tabs 116. FIG. 3a shows a magnified cross-sectional view of a portion of the mold of FIG. 3. Dotted line 14 in FIG. 3a depicts how surface 109 extends upwardly to first flange 107 at points at which there is no tab 116. Referring to FIGS. 3 and 3a, in front mold half 102, convex surface 105 is spaced generally parallel from concave surface 104 and an essentially uniplanar annular second flange 106 extends radially outwardly from the surfaces 104 and 105 in a plane normal, or perpendicular, to the axis of symmetry A of the concave surface 104. Similarly, back mold half 103 has spaced surfaces 109 and 110 and an essentially uniplanar annular first flange 107 extending radially outwardly therefrom in a plane normal to the axis of symmetry B of convex surface 109. Front mold half concave surface 104 has the dimensions of the front curve of the unswelled lens to be cast in the mold and is sufficiently smooth so that the contact lens surface formed is of optically acceptable quality.

Back mold half 103 defines a central curved section with an optical quality convex surface 109 and a generally parallel concave surface 110. Convex surface 109 has the dimensions of the unswelled back surface curve of the lens to be cast and is sufficiently smooth so that the lens surface formed is of optically acceptable quality. Convex surface 105 of front mold half 102 and concave surface 110 of back mold half 103 need not have surfaces suitable to form optical quality surfaces.

The front mold half 102 defines a central, curved section with an optical quality concave surface 104. Concave surface 104 has a circular, circumferential, well-defined edge 111 extending therearound. The edge 111, in conjunction with circumferential edge 120 on the convex surface of the back mold half, forms a well defined and uniform plastic radius parting line for the subsequently molded contact lens. Edge 111 typically has a curvature ranging from about 3 to 45 micrometers or less, preferably about 5 to about 30 micrometers, and the surfaces defining the edge can form an angle in the range of 75 to 90 deg. Continuous with and extending radially outwardly from edge 111 toward outwardly tapering wall 113 is downwardly sloping inner surface 112. Inner surface 112 is in a plane that is about 5 to about 15 degrees below a plane normal, or perpendicular, to the axis of symmetry of concave surface 104.

Each of tabs 116 is composed of an outwardly extending wall 114 that extends radially outwardly from circular edge 120. Wall 114 is in a plane about 5 degrees above or below a plane normal to the axis of symmetry of convex surface 109. Tab 116 is further composed of upwardly extending wall 115 which, at its inferior-most portion is continuous with and extends upwardly from wall 114 and, at its superior-most portion is continuous with convex surface 109. Each tab 116 is preferably configured so that the gap formed between inner surface 112 and wall 114 is about 0.005 to about 0.025 mm., more preferably about 0.010 to about 0.017 mm. Each tab 116 may be about 0.3 to about 1 mm in height, about 0.3 to about 1 mm in width and about 0.3 to about 1 mm in thickness, which thickness is measured outwardly in relation to convex surface 109. The tab is rounded to form a "nose" radius of about 0.1 to about 1 mm, preferably about 0.15 to about 0.23 mm. Applied pressure on the back or front mold half during lens curing ensures 360 degree contact and minimizes tilt, or non-parallelism, between the front and back mold halves.

As shown in FIG. 3a, wall 115 and outwardly tapering wall 113 interact to permit convenient placement of the back mold half after lens material is deposited on the front mold half. In all embodiments, the front and the back mold halves are designed so as to permit rapid transmission of heat therethrough and yet be rigid enough to withstand the prying forces used to separate the mold halves during demolding. The mold of the invention may be used in any method for the manufacture of contact lenses. Preferably, however, the method of manufacture as set forth in U.S. Pat. No. 5,540,410 is used. Generally, in the preferred method, a quantity of polymerizable composition is placed onto the concave surface 110 of front mold half 102, preferably by injection. Back mold half 103 with convex surface 109 facing toward front mold half 102 concave surface 110 is placed onto the polymerizable composition. Preferably, the volume of the polymerizable composition used is greater than the volume of the cavity 101.

Placement of the back mold half 103 onto front mold half 102, thus, will result in excess material flowing into the space created between inner surface 112 and wall 114. The area between first and second flanges 107 and 106 provides an additional space for excess lens material. Convex surface 109 is preferably less wide than concave surface 110 to facilitate centering.

Once mold half 103 is placed onto front mold half 102, the mold halves preferably are pressed together using a force of about 2 to about 5 pounds. The force may be applied to first flange 107 or second flange 106 along the lines depicted by the arrows in FIG. 2. The force may be applied by any convenient means including, without limitation, using air pressure, mechanical means, such as a spring, or a combination thereof. In one embodiment, a deposition nozzle that is flat-shaped to lay across the flange or one that is a combination of cone and flat-shaped to fit partially into mold half 102 or 103 is used. The force is maintained throughout the polymerization of the polymerizable composition.

The polymerizable composition is preferably polymerized by exposure to ultra-violet radiation. Following completion of polymerization, the mold formed by front and back mold halves 102 and 103, respectively, is disassembled and the cast lens undergoes additional processing.

What is claimed is:

1. A mold for a contact lens, comprising a front mold half and a back mold half wherein: the front mold half comprises a central curved section with a concave surface, a convex surface and a circular circumferential edge about the concave surface of the central curved section, the central section of the concave surface suitable for imparting a curvature to a front curve of a contact lens; the front mold half also having an axis of symmetry of the concave surface and an inner surface continuous with and extending downwardly from the circular edge in a plane about 5 to about 15 degrees below a plane normal to the axis of symmetry of the concave surface, an outwardly tapering wall extending upwardly from the inner surface, and an annular flange integral with and surrounding the outwardly tapering wall and extending radially outwardly from the concave and convex surfaces in a plane normal to the axis of symmetry of the concave surface; the back mold half comprises a central curved section with a concave surface, a convex surface and a circular edge about the convex surface of the central curved section, the central curved section of the convex surface suitable for imparting a curvature to a back curve of a contact lens; and the back mold half also having an axis of symmetry of the convex surface, a plurality of spaced apart tabs on the convex surface positioned and formed so that they center front and back mold halves and maintain a constant height between them, each of the tabs comprising a wall extending outwardly from the circular edge of the convex surface, and an upwardly extending wall continuous with and extending upwardly from the outwardly extending wall at an inferior-most portion of the upwardly extending wall and continuous with the convex surface at superior-most portion of the upwardly extending wall, and an annular flange integral with and surrounding and extending radially outwardly from the concave and convex surfaces in a plane normal to the axis of symmetry of the convex surface wherein there is a gap between the inner surface and the concave surface.

2. The mold of claim 1, wherein each of the spaced part tabs is about 0.3 to 1 mm in height, about 0.3 to about 1 mm in width and about 0.3 to about 1 mm in thickness.

* * * * *